June 18, 1968 J. T. RYMER 3,388,799
FILTER FOR FLUIDS

Filed June 24, 1966 7 Sheets-Sheet 1

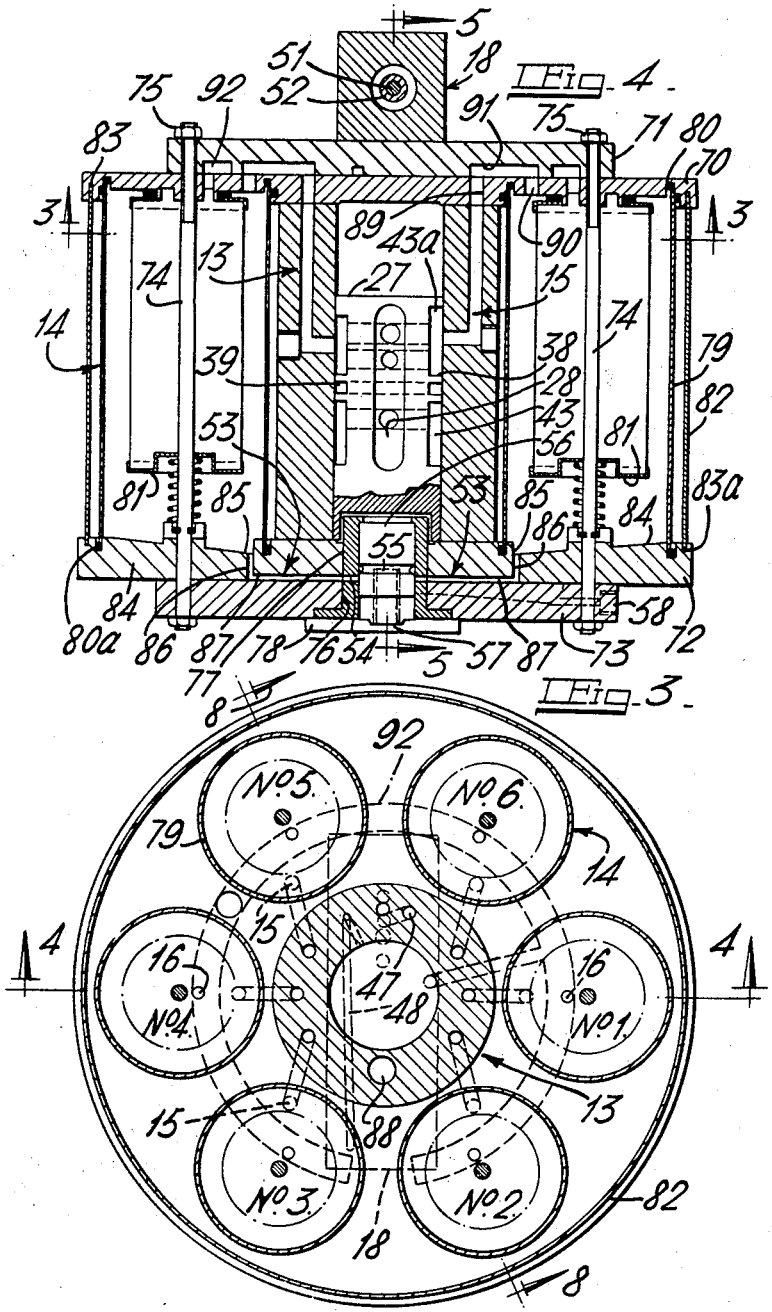

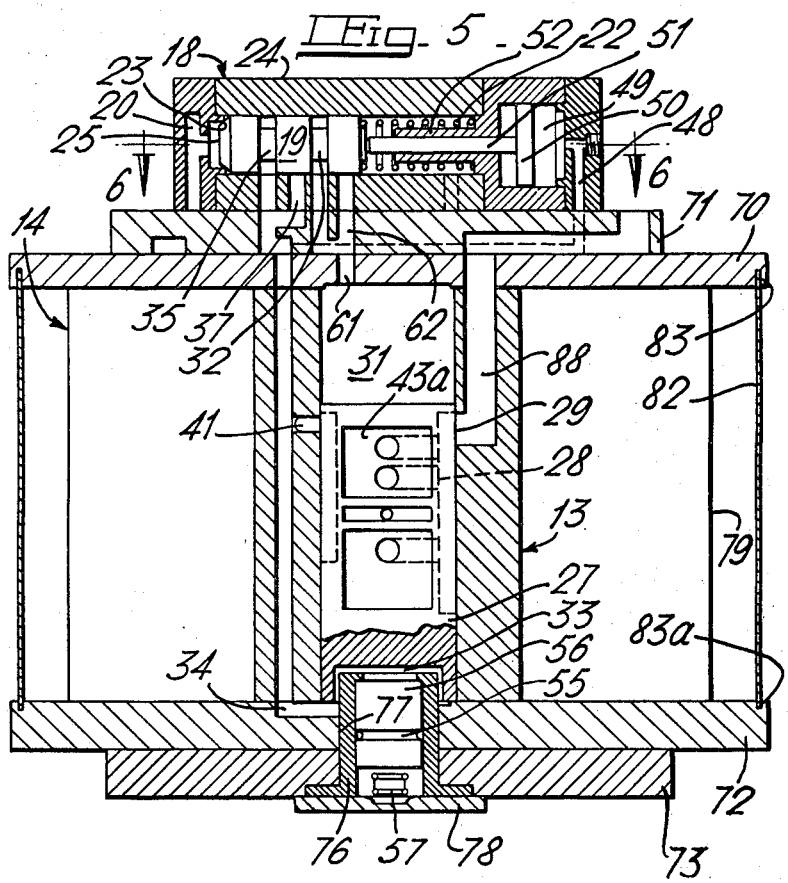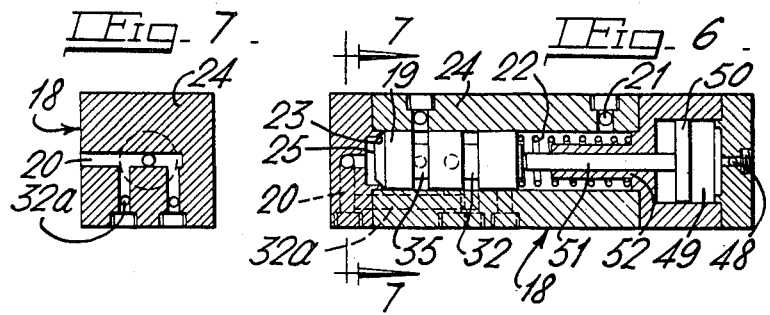

June 18, 1968  J. T. RYMER  3,388,799
FILTER FOR FLUIDS
Filed June 24, 1966  7 Sheets-Sheet 5
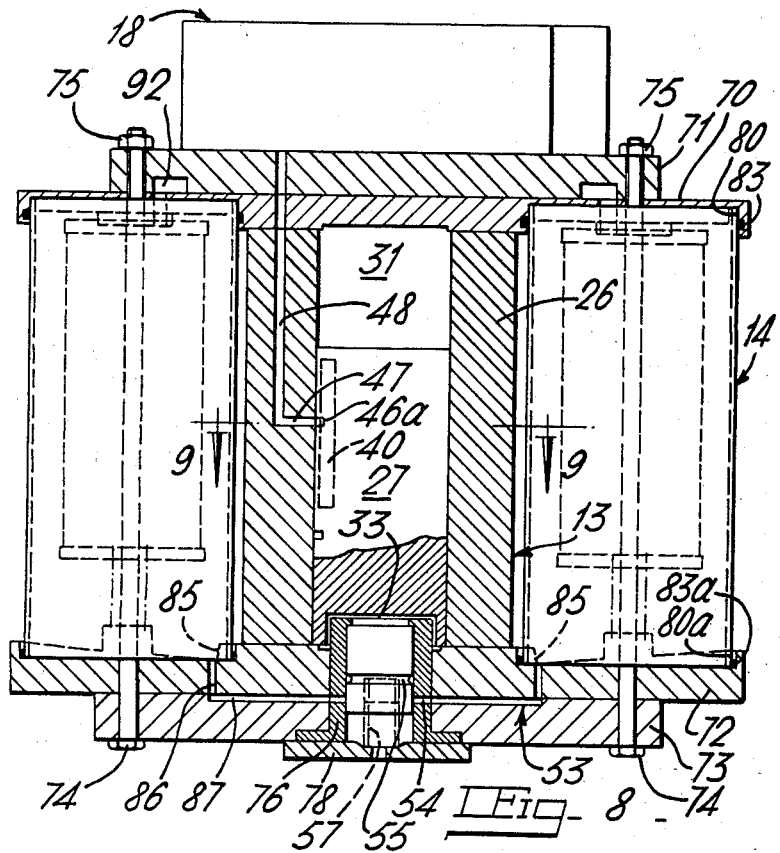
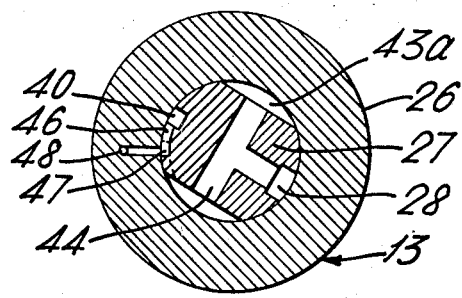

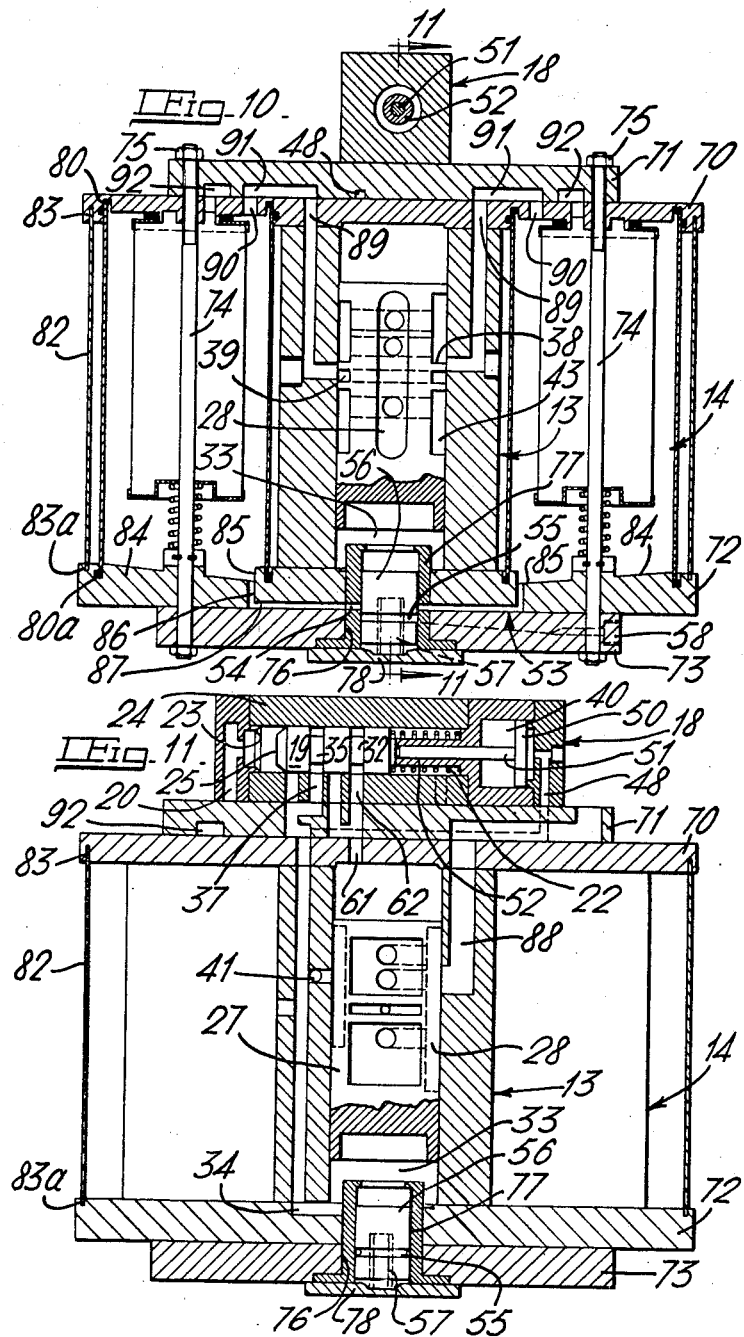

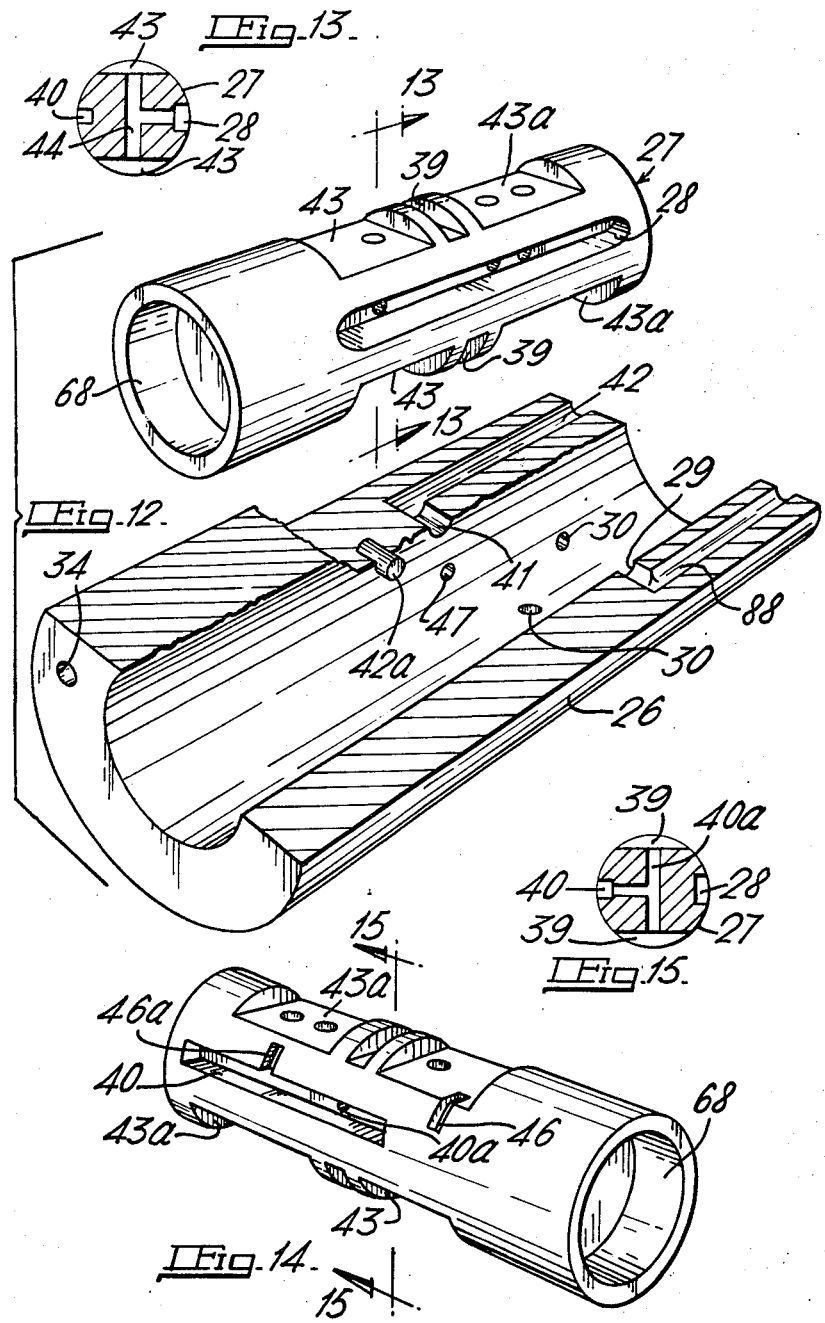

United States Patent Office 3,388,799
Patented June 18, 1968

3,388,799
FILTER FOR FLUIDS
Jesse T. Rymer, Brockley House, Nailsworth,
Gloucestershire, England
Filed June 24, 1966, Ser. No. 560,133
Claims priority, application Great Britain, June 24, 1965,
26,724/65
4 Claims. (Cl. 210—102)

ABSTRACT OF THE DISCLOSURE

Self-cleansing fluid filter in which a number of filter elements are grouped around a distributor valve through which unfiltered fluid is pumped to the elements. A pressure-sensitive valve influenced by the pressure drop across the filter elements actuates the distributer valve to back-flush each filter element in turn when the pressure drop reaches a predetermined value, without interrupting the flow of filtered fluid.

This invention relates to improvements in fluid filters and more particularly to a self cleansing multi-element filtering apparatus in which the filter elements are automatically cleaned without interruption of the flow of filtered fluid.

According to the invention I now propose self cleansing fluid filter apparatus comprising a number of filter units each formed by a container having an inlet connected to a common source of unfiltered fluid, an outlet for filtered fluid and an element within the container separating these connections such that fluid flowing through the unit from inlet to outlet passes through the filter element, in which pressure sensing means are arranged to respond to the pressure difference between inlet and outlet of the filter units when this pressure difference exceeds a pre-determined value and cause filtered fluid to flow in succession in a reverse direction through each of the filter units, a flow of fluid in the normal filtering direction being maintained in at least one of the remaining units while the reverse flow of fluid passes through any one of the units.

Preferably the pressure sensing means comprise a control valve which is operated by the fluid being filtered and controls a fluid operated distributor valve which directs the flow of unfiltered fluid to each of the filter units. However, where the nature of the fluid to be filtered renders it unsuitable for use in operation of the control and distributor valves the control system may be isolated from the fluid filtering system and may be operated by a suitable hydraulic fluid.

Preferably also means are provided for extracting filtered sludge from the filter units and according to a feature of the invention sludge extracting means are actuated automatically on operation of the reverse flow filter cleansing means.

One embodiment of the invention will now be described by way of example only reference being made to the accompanying drawings in which:

FIGURE 3 is a plan view of a fluid filter unit according to the invention shown in the position of normal filtering operation;

FIGURE 4 is a vertical sectional view taken generally on the line 4—4 in FIGURE 3;

FIGURE 5 is a vertical sectional view taken on the line 5—5 of FIGURE 4;

FIGURE 6 is a horizontal sectional view taken on the line 6—6 of FIGURE 5;

FIGURE 7 is a sectional view taken on the line 7—7 of FIGURE 6;

FIGURE 8 is a vertical sectional view taken on the line 8—8 of FIGURE 3;

FIGURE 9 is a horizontal sectional view taken on the line 9—9 of FIGURE 8;

FIGURE 10 is a view similar to FIGURE 4 showing the filter unit in back-flushing operation;

FIGURE 11 is a view similar to FIGURE 5 showing the filter unit in back-flushing operation;

FIGURE 12 is an exploded perspective view to a larger scale partly fragmented to show details of a distributor valve assembly shown in FIGURES 1 to 5;

FIGURE 13 is a sectional view to a smaller scale taken in the direction of arrows 13—13 on the piston shown in FIGURE 12;

FIGURE 14 is a perspective view of the reverse side of the piston shown in FIGURE 12; and FIGURE 15 is a sectional view to a smaller scale taken in the direction of the arrows 15—15 in FIGURE 14.

Figure 1:
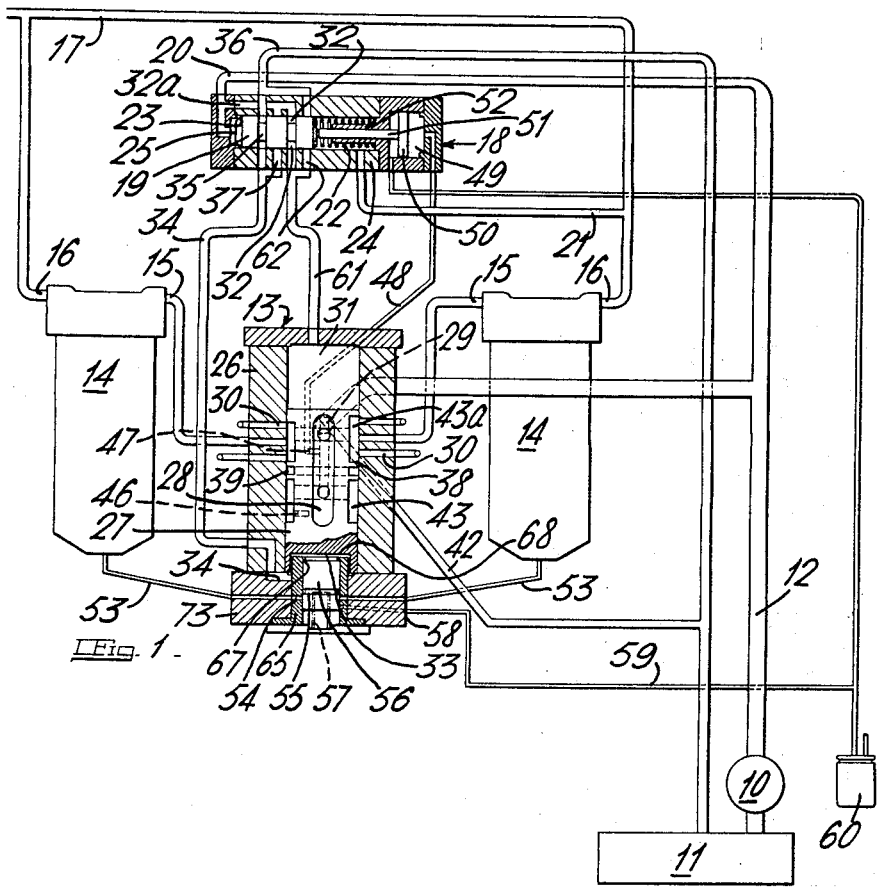
FIGURE 1 is a diagrammatic view of fluid filtering apparatus in the normal filtering condition.

The fluid filtering apparatus illustrated comprises a supply pump 10 which draws oil to be filtered from a tank or sump 11 passes it through a passage 12 to a distributor valve 13 which in the filtering condition directs the flow of oil to each of a number of filter units 14. Six such filter units are shown and each comprises an inlet connection 15 through which oil is supplied from the distributor valve 13, a filter element within the unit through which the flow of oil passes to an outlet 16 from which filtered oil flows to a collecting pipe 17.

Pressure sensing means are provided to respond to the pressure drop across the filter units 14 and comprise a control valve generally indicated at 18 in which is carried a sliding piston 19. One side of the piston 19 is exposed to the unfiltered oil at pump delivery pressure through a passage 20 and the other side of the piston is exposed to the pressure of the filtered oil in the pipe 17 through a passage 21. In the normal filtering condition of the apparatus as shown in FIGURE 1 the piston 19 is urged to the left by a coiled compression spring 22 and seats against a shoulder 23 in the valve housing 24, so that only the front face 25 of the piston 19, which has an area substantially less than the total cross-sectional area of the piston, is exposed to the pump pressure. The piston 19 is held on the shoulder 23 by the combined force of the spring 22 and pressure of the filtered oil.

The distributor valve 13 comprises a cylindrical housing 26 in which an elongated piston 27 is slidably mounted. In the normal filtering position shown in FIGURE 1 an elongated channel 28 formed in the surface of the piston 27 communicate with an inlet connection 29 from the supply passage 12 and outlet connections 30 leading to the inlets of the filter units 14.

The piston 27 as best illustrated in FIGURES 12 to 15 is of generally cylindrical form. The channel 28 extends axially on the surface of the piston 27 (see FIGURE 12) and communicates by means of T-shaped passages 44 (see FIGURE 13) with four wide slots 43, 43a milled on opposite sides of the piston and spaced 90° from the slot 28.

Figure 2:
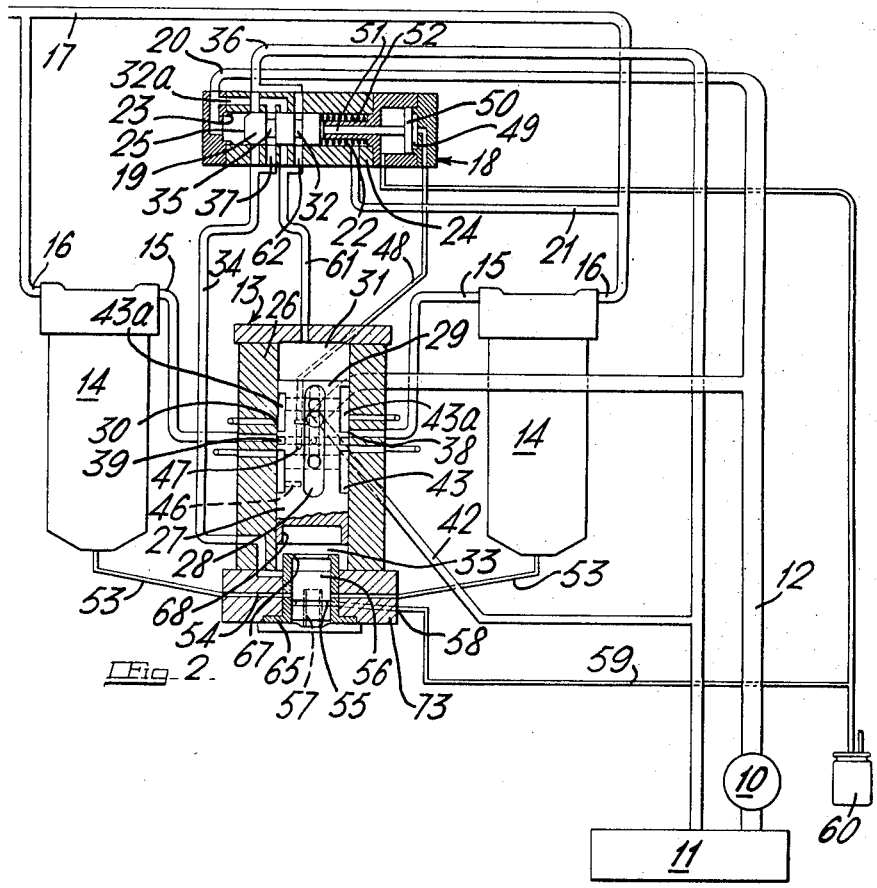
FIGURE 2 shows the fluid filtering apparatus in the reverse flow or back-flushing condition.

The outlet connections 30 in the wall of the cylindrical housing 26 are axially spaced as indicated in FIGURES 1 and 2 and are grouped in threes on opposite sides of the cylinder. The connections 30 of each group, as well as being axially spaced, are circumferentially spaced on the cylindrical wall 26 as shown in FIGURE 12 so that in the normal filtering position of the piston 27 the three connections 30 of each group communicate with one of the milled slots 43a on the piston.

A second axially directed channel 40 is formed on the surface of the piston 27 and a T-shaped passage 40a (see FIGURE 15) leads from this channel to a pair of milled slots 39 on opposite sides of the piston. These slots 39, best seen in FIGURES 12 and 14 are aligned with the slots 43 and 43a but are separated therefrom. The channel 40 is in sliding communication with an outlet port 41 in the wall of the housing 26, leading to a drain passage 42.

A pin 42a set in the wall of housing 26 protrudes into and is in sliding engagement with the channel 40 in the piston 27, permitting the piston to slide axially in the housing 26 but preventing rotation of the piston so that registering ports and passages in the piston 27 and housing 26 remain at all times in mutual alignment. The space 31 above the piston is filled by oil at pump delivery pressure from a passage 61 which communicates with a passage 32 in the piston 19 and a passage 32a in the valve housing branched from the passage 20. The space 33 below the piston 27 is drained through a passage 34 which leads to the control valve 18 and communicates through a passage 35 in the piston 19 with a drain passage 36 leading back to the sump 11.

After a period of normal filtering operation with the apparatus as shown in FIGURE 1, impurities filtered from the oil and accumulating on the filter elements produce an increasing pressure drop across the filter units 14, until the pressure of the filtered oil is reduced to such a degree that the pump delivery pressure of the oil acting on the front face 25 of the piston 19 is just sufficient to move the latter, to the right as shown in FIGURES 1 and 2, away from the seating shoulder 23. The pump delivery pressure then acts on the entire cross-sectional area of the piston 19 which is moved rapidly to the right to the position shown in FIGURE 2 and arrested by abutting a piston-rod 51 with the passage 35 still communicating with the passage 34 by way of a branched passage 37 in the wall of the valve 18. Oil at pump delivery pressure is then supplied through passages 20, 32a, passage 35 and passage 34 to the space 33 beneath the piston 27 of the distributor valve 13. The space 31 above the piston 27 is at the same time connected to drain through passage 61, branch 62, passage 32 in piston 19 and passage 36. The pressure of oil in the space 33 then being greater than the oil pressure in the space 31 the piston 27 begins to move upwards. As the piston 27 rises the inlet connection 29 remains in communication with the elongated channel 28 and hence via passage 44 and slots 43a with the outlet connections 30 leading to the filter units 14 until a point 38 at the lower edge of slot 43a moves above the lowermost of the outlet connections 30 cutting off the supply of unfiltered oil to the corresponding filter unit 14. On further upward movement one of the transverse slots 39 in the piston 27 comes into register with the lowermost outlet connection 30. The transverse slot 39 communicates via passage 40a with the elongated axially extending channel 40 on the surface of the piston spaced at 180° from the channel 28, the channel 40 in turn being in sliding communication with an outlet 41 in the wall of the valve housing leading to a drain passage 42. With the slot 39 in register with the lowermost connection 30 the inlet of the corresponding filter unit is connected to drain and the oil pressure in the collecting pipe 17 causes a reverse flow of filtered oil to pass through this unit. This reverse flow of oil tends to free the filter element of the accumulated impurities which settle to the bottom of the filter unit. The reverse flow of oil passes through the lowermost connection 30, slot 39, passage 40a, channel 40, outlet 41 and passage 42 and is returned to the sump 11.

On continued upward movement of the piston 27 the transverse slot 39 moves out of register with the lowermost connection 30 and into register with the second lowermost connection 30 on the opposite side of the piston so that a reverse oil flow is set up in filter unit No. 2. One of the lower slots 43 on the piston moves into register with the lowermost connection 30 so that the corresponding filter unit No. 3 is reconnected to the supply of unfiltered oil and resumes normal filtering operation.

The piston 27 continues its upward stroke successively isolating and connecting to drain for back-flushing each of the filter units, and subsequently reconnecting each filter unit for normal filtering operation. The dimensions of the distributor valve are such that never more than two of the filter units are isolated from the supply of oil from the pump 10 so that at all times during the filter cleansing cycle an output of filtered oil of substantially two thirds of the normal flow is delivered.

As the piston 27 reaches the top of its stroke in the housing 26 a groove 46 extending circumferentially from the lower end of one of the slots 43 (see FIGURE 14) comes into register with a port 47 in the housing wall, and oil at pump delivery pressure is supplied through port 47 to a passage 48 leading to a chamber 49 in the control valve 18. A piston 50 in the chamber 49 is carried on the piston rod 51 which extends through a guide 52 into the chamber in which the piston 19 moves. High pressure oil supplied through the passage 48 to the chamber 49 moves the piston 50, to the left as seen in FIGURES 1 and 2, and the rod 51 abuts the piston 19 and moves it to the left also until it is reseated on the shoulder 23. This movement of the piston cuts off the supply of high pressure oil to the space 33 in the distributor valve and reconnects this space to drain via passages 35 and 36. The passage 32 in the piston 19 now communicates with passage 32a and passage 61 so that oil at pump delivery pressure from the passage 20 is supplied to the space above piston 27 causing this piston to move downwards, and each filter unit is again back-flushed as the slots 39 in the piston 27 place the corresponding connections 30 in communication with drain.

During the downward stroke of the piston 27 the port 47 in the housing 26 is closed by the unbroken surface of the piston moving past it and the oil in the chamber 49 is trapped. The piston 19 is therefore held securely against the shoulder 23. When the distributor valve piston once more reaches the normal filtering position as shown in FIGURE 1 a short groove 46a extending from the channel 40 on the piston 27 connects the ports 47 and 41 in the housing wall so that the chamber 49 of the control valve 18 is connected to drain and the piston rod 51 no longer urges the piston 19 against the shoulder 23. The piston 19 is again subjected on its front face 25 to the oil at pump delivery pressure and on its rear face to the force of the compression spring 22 and the pressure of the filtered oil from the pipe 17. As a result of the cleansing effect of the back-flushing of the filter elements the pressure of the filtered oil will usually be sufficient in combination with the force of the spring 22, to hold the piston 19 against the seating 23. However if for any reason the cleansing effect on the filter elements has not been sufficient the pressure difference between the oil acting on opposite ends of the piston will cause the latter to be moved to the right once again, reconnecting the supply of high pressure oil to the space 33 to repeat the cleansing cycle. As the piston 19 moves (to the right in FIGURES 1 and 2) at the start of a back-flushing cycle it engages and carries with it the piston rod 51 so that the piston 50 is also moved and any oil present in the chamber 49 is drained via passage 48, port 47, slot 46a, channel 40, port 41 and passage 42, before the piston 27 begins to rise.

Sludge extraction passages 35 connected to the lower ends of the filter units 14 communicate with ports 54 in opposite sides of the lower end of the distributor valve housing 26 which, in the normal filtering position of the apparatus as shown in FIGURE 1, register with the unbroken surface of a piston 56 above a circumferential groove 55 therein, the piston 56 being slidably supported in a liner 65 carried in a plate 73 secured to the lower end of the housing 26. The sludge piston 56 is retained in the liner 65 by a lip 67 and is urged upwards against this lip by a compression spring 57. During normal filtering operation there is no oil pressure on the underside of piston 27, and this piston lies seated at the lower end of the housing 26, the upper end of the liner 65 being received in a recess 68 formed in the lower end of the piston 27. The sludge piston is engaged against the lip 67 and in this position the groove 55 is out of register with the passages 53.

On commencement of the back-flushing cycle high pressure oil supplied to the space 33 beneath the piston 27 acts on the upper surface of the sludge piston 56 and depresses it, compressing the spring 57. The piston 56 moves downwards and as the groove 55 passes the passages 53 it is filled with sludge. The piston 56 continues moving downwards until it abuts the lower end of the liner 65. In this position shown in FIGURE 2 the groove 55 in the piston registers with a discharge port 58 in the liner wall and the sludge passes through a passage 59 to a collection tank 60. With each back-flushing cycle of the apparatus a quantity of sludge is extracted by the sludge piston 56 and discharged to the tank 60.

While the invention has been described above mainly with reference to the schematic drawings of FIGURES 1 and 2, the filtering apparatus could more conveniently be manufactured in a very compact arrangement as illustrated in FIGURES 3 to 11 in which like reference numerals have been used to denote parts similar to those of FIGURES 1 and 2.

As shown in FIGURES 3 to 11 the filter apparatus comprises a number of filter units 14 grouped around a central distributor valve 13 between a top plate 70 and a clamping plate 71, and a bottom plate 72 and clamping plate 73. The top and bottom plates lie against the ends of the cylindrical housing 26 of the distributor valve 13 and the control valve 18 is carried on the clamping plate 71. The top and bottom plates are generally disc shaped and are secured together by means of elongated bolts 74 and nuts 75. The sludge piston liner 65 is flanged at its lower end and is carried in a stepped bore 76 in the clamping plate 73, extending through a registering bore 77 in the bottom plate 72. The lower end of the liner 65 is closed by a cover plate 78 which forms a seating for the compression spring 57 and is releasably secured to the clamping plate 73.

Each filter unit comprises a thin cylindrical casing 79 of suitable material, the upper and lower ends of which are sealed in registering circular grooves 80, 80a, in the top and bottom plates respectively, within which is carried a filter element 81. The filter units are enclosed by a large diameter cylindrical shield 82 the upper and lower edges of which are received in grooves 83, 83a in the top and bottom plates respectively.

The base of each filter unit 14 is formed by a sloping surface 84 on the bottom plate 72 so that each filter unit has a well 85 (see FIGURE 4) in which deposited sludge tends to accumulate. The sludge passage 53 from each filter unit is formed by a drilled hole 86 through the plate 72, a surface groove 87 on the underside of this plate closed by the adjacent top face of the clamping plate 73, and a registering port in the liner 65. The sludge passage 58 is formed as a drilled bore in the plate 73 connected to a port in the liner 65.

The inlet connection 29 (see FIGURE 5) from the pump supply comprises a passage 88 through the clamping plate 71, top plate 70 and housing wall 26.

The outlet connections 30 lead by way of passages 15 to the filter units 14 and each passage 15 comprises an L-shaped drilling in the housing 26, a registering bore 89 in the top plate 70, a second bore 90 in the top plate opening into the filter element 81, and a slot 91, formed in the underside of the clamping plate 71 and closed by the top plate 70, joining the bores 89 and 90.

The outlet from each filter unit 14 comprises a bore 16 in the top plate 70 leading into an annular passage 92 formed by slots in the lower surface of the clamping plate 71 closed by the adjacent surface of the top plate 70.

The pressure sensitive valve 18 is mounted directly on top of the top clamping plate 71 and passages by which liquid is supplied to this valve are formed by registering openings in the plates 70 and 71 as shown in FIGURE 5.

With the arrangement described I provide a filtering apparatus which performs a self cleansing cycle entirely automatically in response to the drop in pressure of the filtered fluid when deposits of impurities have accumulated on the filter elements. The control system of the apparatus is hydraulically operated employing only piston valves and is therefore extremely reliable in service and inexpensive to manufacture. The apparatus maintains at all times an uninterrupted flow of filtered fluid and uses very little of the fluid being filtered. The fluid used to back-flush the filter units is returned to the sump and only a very small quantity of fluid is discharged with the sludge to the tank 60.

The maximum pressure differential at which the back-flushing cycle is automatically initiated can be adjusted to any desired predetermined value by altering the proportions of the control valve 18 or more simply by varying the force of the compression spring 22. The apparatus can be arranged to be back-flushed at a relatively small pressure differential across the filter units and in this case the filter elements will be maintained in a very clean condition by frequent back-flushing. Since, as explained, it is possible with the apparatus described to maintain the filter elements in a remarkably clean condition then for a given supply of oil to be filtered, with my apparatus I can employ filter elements which are either finer or of smaller flow area than it would otherwise be possible to use.

While the invention has been described above in relation to an oil filtering apparatus it will be appreciated that the invention can be applied to filtering apparatus for a wide range of fluids.

In an alternative arrangement of filter apparatus (not shown) the inlet and outlet connections of the filter units are connected at the lower ends of these units. With this arrangement no separate sludge extraction means is provided. The sludge displaced from the filter elements settles to the bottom of the units and is carried back to the sump by the back-flush oil flow through the filter units during the self-cleansing cycle. A settling tank is provided in the sump to prevent the discharged sludge from being recirculated.

I claim:
1. Self-cleansing fluid filter apparatus comprising a number of filter units each formed by a container having an inlet connected to a source of unfiltered fluid, an outlet for filtered fluid, and an element within the container separating these connections such that fluid flowing through the unit from inlet to outlet passes through the filter element, pressure sensing means responsive to the pressure difference between inlet and outlet of the filter units and operative, when this pressure difference exceeds a predetermined value, to cause filtered fluid to flow in reverse direction through each of the filter units in succession, a flow of fluid in the normal filtering direction being maintained in at least one of the remaining unit while the reverse flow of fluid passes through any one of the units, the filter being grouped about a distributor valve and supported between end plate assemblies, said distributor valve comprising a piston slidably mounted in a cylindrical housing, an inlet connection for the supply of unfiltered fluid to said apparatus, said inlet connection leading via a passage to an opening on the inner wall of said housing, first passage means in said piston in slidable communication with said opening and with a plurality of outlet ports in said housing, each outlet port leading to the inlet connection of one of said filter units, an outlet from each filter unit leading to a common outlet passage, a drain port in said housing wall being in sliding communication with second passage means in said piston, said second passage means being selectively communicable with each of said outlet ports whilst said first passage means communicates with every other outlet port, the arrangement being such that when said second passage means communicates with one of said outlet ports a back-flushing flow of fluid can flow through the corresponding filter unit, while a normal filtering fluid flow is maintained in the remaining filter units.

2. Self-cleansing fluid filter apparatus according to claim 1 wherein the pressure sensing means comprise a control valve operative to cause said piston to move and connect each of said outlet ports successively to drain.

3. Self-cleansing fluid filter apparatus according to claim 1 wherein each filter unit comprises a tubular housing the ends of which are sealed in annular grooves in a top plate assembly and a bottom plate assembly respectively, the apparatus being secured together by a number of elongated bolts each passing axially through one filter unit and the top and bottom plate assembly and secured by nuts to clamp the apparatus together, a filter element within each unit being carried on the bolt and resiliently urged against one end of the unit.

4. Self-cleansing filter apparatus according to claim 1 further comprising sludge extracting means operative in conjunction with said piston to remove sludge from the bottom of each filter unit.

References Cited

UNITED STATES PATENTS

| | | | |
|---|---|---|---|
| 864,810 | 9/1907 | Taylor | 210—108 |
| 2,441,526 | 5/1948 | Zollinger | 210—108 |
| 3,157,131 | 11/1964 | Brybon | 210—108 X |
| 3,228,524 | 1/1966 | Richards | 210—108 X |
| 3,244,283 | 4/1966 | Woody | 210—108 |
| 3,333,699 | 8/1967 | Bliss et al. | 210—134 |

FOREIGN PATENTS 27,581  1/1915  Great Britain.

REUBEN FRIEDMAN, *Primary Examiner.*

J. ADEE, *Assistant Examiner.*